(No Model.)
J. N. MONTGOMERY.
ANIMAL YOKE.
No. 450,758. Patented Apr. 21, 1891.
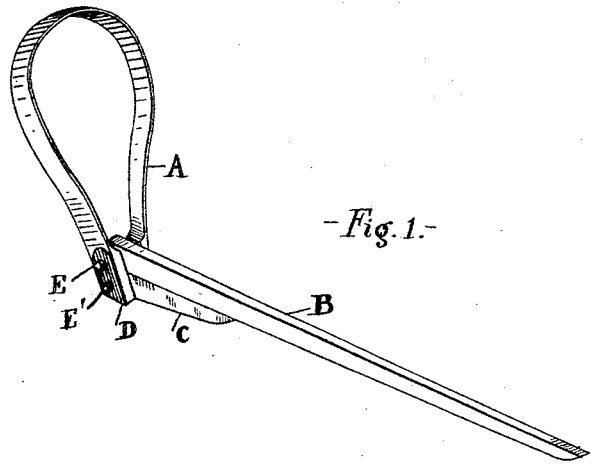
-Fig. 1.-
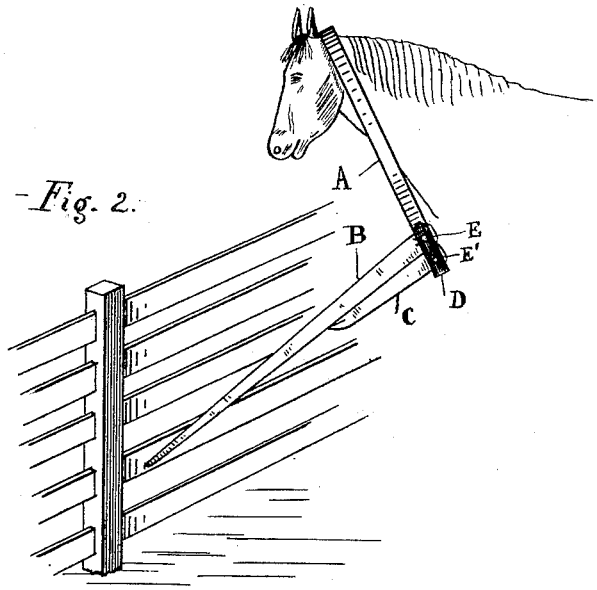
-Fig. 2.-
Witnesses—
H. N. Wells
A. Keithley
Inventor.
Joseph N. Montgomery.
by L. M. Thurlow
Att'y.

UNITED STATES PATENT OFFICE.

JOSEPH N. MONTGOMERY, OF LACON, ILLINOIS, ASSIGNOR OF ONE-HALF TO ANTHONY HACKER, OF SAME PLACE.

ANIMAL-YOKE.

SPECIFICATION forming part of Letters Patent No. 450,758, dated April 21, 1891.

Application filed December 18, 1889. Serial No. 334,231. (No model.)

*To all whom it may concern:*

Be it known that I, JOSEPH N. MONTGOMERY, a citizen of the United States, residing at Lacon, in the county of Marshall and State of Illinois, have invented certain new and useful Improvements in Animal-Yokes; and I do hereby declare the following to be a full, clear, and exact description of the invention, such as will enable others skilled in the art to which it appertains to make and use the same.

This invention relates to the improvement of animal-yokes. Its object is to provide a yoke for domestic animals which will permit them to feed freely in pasture and at the same time effectually prevent such animal from leaping an ordinary fence inclosing such pasture.

I refer to the accompanying drawings and the letters of reference marked thereon, and make the same a part hereof.

A is a collar for the animal's neck. It is constructed, preferably, of wood and of one piece, bent as is shown in the drawings at A. The two ends of the collar are brought near each other, but with room enough between them for the insertion of the poke B and brace C. These are held in place by the bolts or pins marked, respectively, E and E'. These pins or bolts E and E' extend through the collar and through the poke B and brace C, respectively, and are held in place by split-pins or other suitable device.

It will be observed that the arm of the poke B, as well as the short arm of the brace C, extends beyond the line of the collar, as shown at Fig. 2. By this means, in case the poke B is lifted, the arm acts as a lever on the short arm of the brace C and causes it to follow the motion of the poke. By these means they necessarily keep together, and at the same time do not interfere with a limited motion of the poke.

The brace C, which is my invention, operates to limit the motion of the poke, and at the same time allows it free motion within those limits, and also it operates as a strong brace for the poke when the limit of its motion has been reached.

The operation of my invention is as follows: The collar A is placed on an animal's neck, the poke projecting to the front. When the animal puts its head down to eat, the poke moves freely on the pin E and is followed by the brace, as stated. In case the animal lifts its head the poke falls down until it rests on the brace, where it stops. Then in case the animal attempts to jump a fence the poke is in position to engage the materials of which the fence is constructed, and the brace adds a double strength to the poke.

What I claim as new, and desire to secure by Letters Patent, is—

1. In an animal-poke, a neck-yoke or collar A, having a poke-rod B pivotally secured between its lower extremities by means of a pin or bolt, and a brace C, pivotally secured by a second pin immediately below the said poke-rod and between the said projections, substantially as and for the purposes set forth and described.

2. In an animal-poke, a neck-yoke or collar A, having a poke-rod B pivotally secured between its lower extremities by means of a pin or bolt, and a brace C, pivotally secured thereunder by a pin, the rear or pivoted end of the poke-rod B extending slightly beyond the pivoted end of the said brace C, for the purposes herein set forth and described.

In testimony whereof I affix my signature in presence of two witnesses.

JOSEPH N. MONTGOMERY.

Witnesses:
HENRY W. WELLS,
A. KEITHLEY.